Aug. 8, 1939.                    E. E. LINDSEY                    2,169,052
                                  CHECK VALVE
                              Filed Sept. 13, 1937
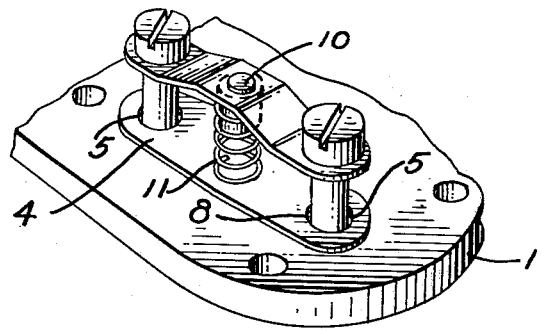
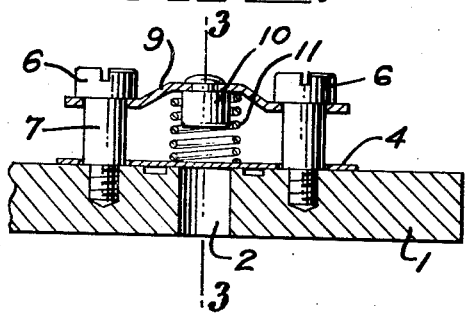   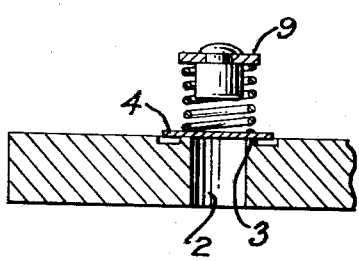
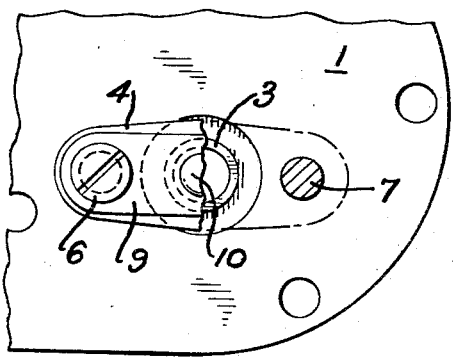   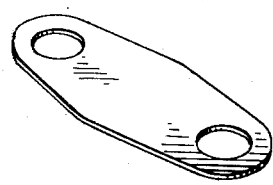
INVENTOR.
ERNEST E. LINDSEY
BY
    Lippincott & Metcalf
                ATTORNEYS.

Patented Aug. 8, 1939

2,169,052

UNITED STATES PATENT OFFICE 2,169,052

CHECK VALVE

Ernest E. Lindsey, Los Angeles, Calif.

Application September 13, 1937, Serial No. 163,581

1 Claim. (Cl. 251—119)

My invention relates to check valves, and more particularly to a check valve to be used in the cylinder head of a reciprocating pump handling a refrigerant mixed with oil.

Among the objects of my invention are: To provide a check valve ideally adapted for handling a refrigerant mixed with oil; to provide a check valve for a reciprocating pump handling a refrigerant which will prevent damage from oil "slugging"; to provide a flexible check valve; to provide a check valve which may open at various angles; to provide a check valve which may be closed and perfectly seated by a very light spring; and to provide a check valve which will handle mixed oil and refrigerant in a refrigerating pump.

Other objects of my invention will be apparent or will be specifically pointed out in the description forming a part of this specification, but I do not limit myself to the embodiment of the invention herein described, as various forms may be adopted within the scope of the claim.

Referring to the drawing:

Fig. 1 is a perspective view of a portion of a cylinder head having the valve of my invention mounted thereon.

Fig. 2 is a view partly in elevation and partly in section, taken longitudinally of the valve and head.

Fig. 3 is a similar view taken across the valve.

Fig. 4 is a top view, in elevation, with portions cut away to show the valve and port relationship.

Fig. 5 is a perspective view of the flexible valve.

Many refrigeration systems utilize reciprocating pumps to exhaust the refrigerant from an evaporator and to compress the expanded gas into a liquid which, after being cooled, is re-expanded in the evaporator. The problem of oiling the moving parts necessitates the mixture of a certain amount of oil in with the refrigerant. This means that under certain conditions oil will accumulate in the cylinder of a reciprocating pump until it reaches such an amount that it is necessary for it to be expelled through the check valve constituting the outlet port of the pump. Under such conditions, the outlet valve must pass what are known in the trade as "slugs" of oil, and if they do not readily pass this oil, then strains are set up which may ruin the pump, and in all events the efficiency of compression is greatly reduced.

I have invented a check valve for use with the reciprocating refrigerant pump which I have found to be highly satisfactory in passing refrigerant mixed with oil and which has supplanted, in practice, many other types of check valve, and I believe that the efficiency thereof is due to the fact that the arrangement of parts is such that the flexible valve may open angularly, in accordance with the manner with which the oil is passed through the outlet port, thus allowing instant ejection, and that a very soft spring can close and perfectly seat the valve.

My invention may be more fully understood by direct reference to the drawing:

In Fig. 1 a cylinder head 1, which is attached in the usual manner to the reciprocating pump 10 cylinder below and to the outlet passage above, is provided with an outlet port 2. I prefer to form an annular valve seat 3 by cutting an annular channel around the port on the outlet side thereof, and to position over the seat thus formed a flexible valve 4 formed of sheet material, such as Swedish spring steel, although I may use shim stock or stainless steel shim stock, and one such valve has been made and found practical when made of material approximately ten thousandths of an inch thick.

The preferred flexible valve is roughly oval and elongated, and is provided near each end thereof with a stud aperture 5. The valve is maintained in position by a pair of upright studs 6 screwed into the cylinder head 1 and having cylindrical sides 7 passing through the stud apertures 5, and in this respect I desire to have the apertures 5 considerably larger than the diameter of the studs so that the valve is free to move around the studs. In a practical example that I have built and found to be satisfactory, I use a difference in diameter of as much as one sixty-fourth of an inch. This clearance is clearly shown in the drawing and is indicated by the numeral 8.

Also mounted on studs 6 is a cross member 9 having a central spring retainer 10 thereon, and a flexible spiral spring 11 extends from spring retainer 10 to contact the flexible valve immediately over the valve seat 3. I prefer that the diameter of the spring 11 be substantially the same as the annular valve seat 3, so that the lower end of the spring bears on the valve directly over the valve seat.

In operation, the flexible valve 4 may lift in almost any conceivable manner. For instance, one end of the flexible valve may lift along its stud, the other end remaining in place against the cylinder head. Likewise, the valve may open angularly across its shorter diameter, with one side of the valve open, the other side still remaining in contact with the cylinder head; or the valve may open as a whole as far as the spring will allow. All combinations of these motions are possible, and furthermore, due to the fact that a clearance is provided between the valve apertures and the studs, the valve may slide around on the annular seat and thus keep the annular seat clean.

Inasmuch as I can find no better explanation at present for the efficiency of this valve in handling mixed refrigerant and oil, I believe that it is the ability of this valve to open under all sorts of angles that provides the extreme efficiency which I have found, in practice, to be accomplished therewith. Further, the valve as designed can be properly seated by a very soft spring, which permits opening under slight pressure differentials, and yet prevents the compressed gas from leaking back on the piston return stroke.

I claim:

A check valve comprising a base plate having a valve port therein and an annular channel in said base plate surrounding said port to provide an annular valve seat around said port, a thin flexible valve extending across said port and registering on said seat, said valve being substantially longer than wide and having apertures near each end thereof, a headed stud passing through each of said apertures and entering said base plate, said studs being of substantially lesser diameter than said apertures, a coil spring of substantially the same diameter as said annular seat and bearing directly on said valve over said seat and coaxial with said seat, and inflexible spring retaining means mounted on said studs and positioning said spring under tension, said spring being the sole controlling force on said valve whereby said valve may tilt freely with respect to said base to angles limited only by the space between said studs and the edges of said apertures, and simultaneously rise and flex.

ERNEST E. LINDSEY.